United States Patent
Vonhoff, Jr.

[15] 3,696,834
[45] Oct. 10, 1972

[54] FLUID CONTROL DEVICE
[72] Inventor: William Vonhoff, Jr., Aurora, Ill.
[73] Assignee: Thor Power Tool Company, Aurora, Ill.
[22] Filed: Jan. 29, 1971
[21] Appl. No.: 110,840

[52] U.S. Cl. .................137/596, 173/163, 173/169, 151/6
[51] Int. Cl. ............................................F16k 11/10
[58] Field of Search ................91/59; 81/52.4, 52.3; 24/221 A; 151/6; 173/163, 169; 137/596.1; 192/150

[56] References Cited

UNITED STATES PATENTS 3,373,824   3/1968   Whitehouse..............91/59 X

FOREIGN PATENTS OR APPLICATIONS 542,028   12/1941   Great Britain..........24/221 A Primary Examiner—Henry T. Klinksiek
Attorney—Hibben, Noyes & Bicknell

[57] ABSTRACT

A fluid control device for controlling a flow of motive fluid to an associated fluid driven mechanism is disclosed, wherein a fluid pressure actuated shut-off valve is provided for automatically shutting off the flow of motive fluid to the associated mechanism whenever the pressure in the fluid passage of the device reaches a predetermined value. A novel adjusting structure is provided for varying the response pressure of the shut-off valve.

11 Claims, 6 Drawing Figures

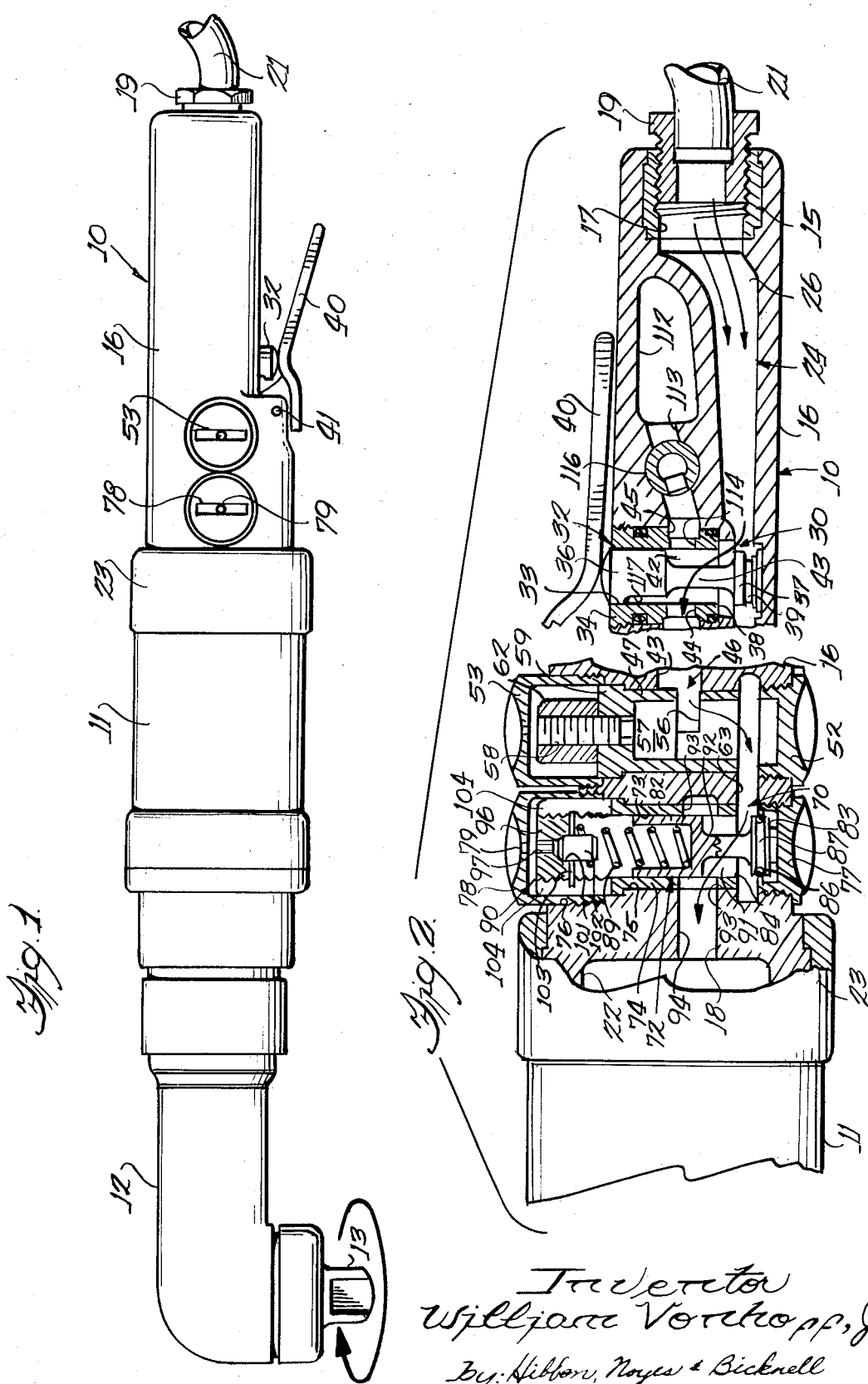

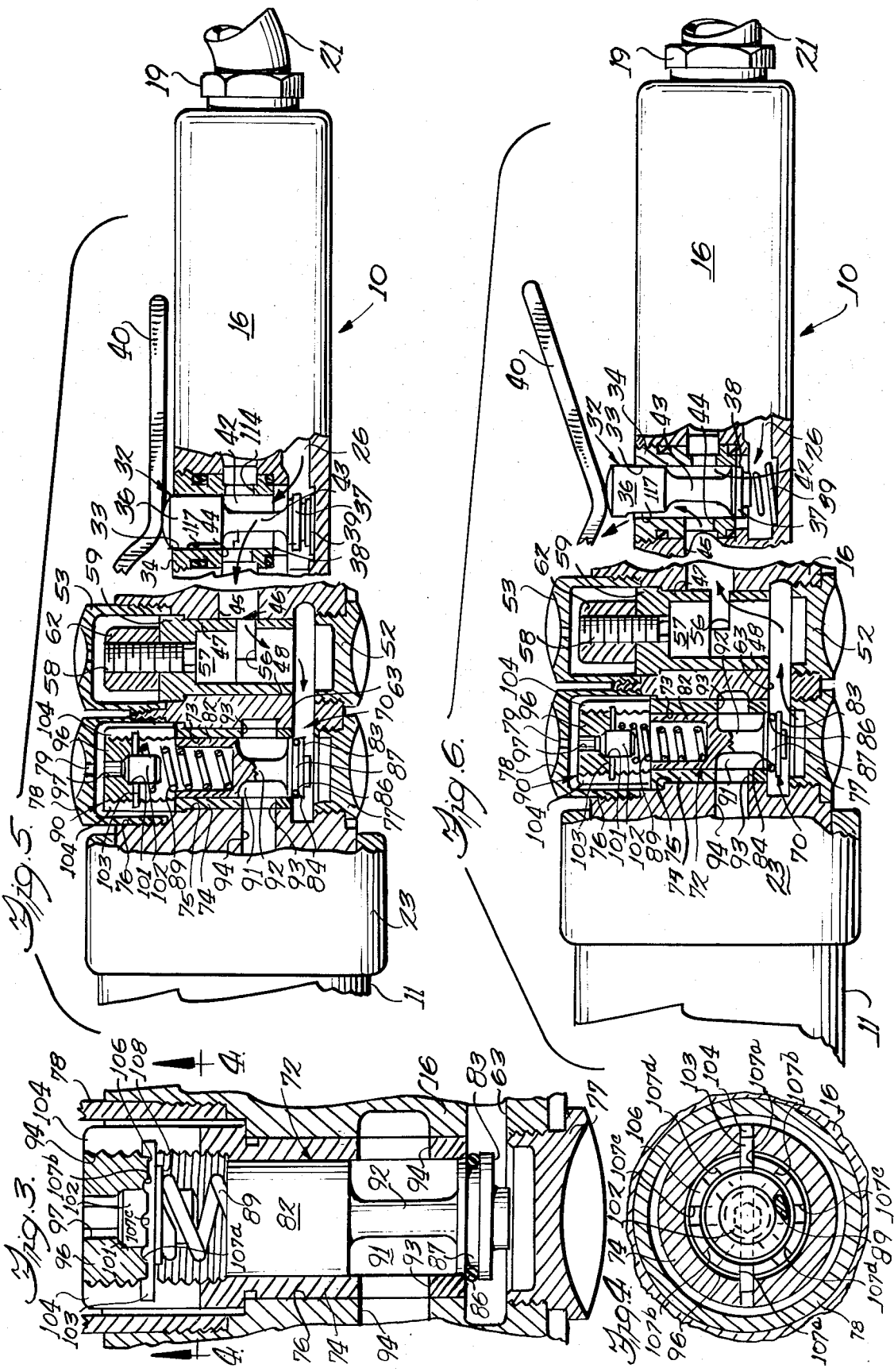

FLUID CONTROL DEVICE

This invention relates to fluid control devices and more particularly to a fluid control device for limiting the torque developed by an associated fluid driven mechanism to a predetermined value.

Various types of torque limiting or torque controlling devices have been heretofore advanced for limiting the torque developed by an associated fluid driven mechanism, such as a pneumatic nut setter, to a predetermined value. While most of such devices have proved generally satisfactory for their intended purpose, others have not for various reasons, such as difficulty and insufficient fineness of adjustment, slow response time, and high cost. Examples of two of such prior art devices are disclosed in the Whitehouse U.S. Pat. No. 3,373,824 and the Boeger et al. U.S. Pat. No. 3,493,056.

Accordingly, it is a general object of the present invention to provide a novel and improved fluid control device, which overcomes the aforementioned objections to and disadvantages of the prior art.

A more particular object is to provide a novel fluid control device having a fluid pressure actuated shut-off valve, which utilizes a poppet-type construction to reduce the travel and response time of the valve.

A specific object is to provide a novel adjusting structure for rapidly and positively adjusting the response pressure of the shut-off valve of a fluid control device of the character described.

Another object is to provide a novel fluid control device of the character described, wherein the principal components thereof are connected by a substantially unrestricted fluid passage.

A further object is to provide a novel fluid control device for controlling the flow of motive fluid to an associated fluid driven tool, which substantially prevents the application of any reaction force to the operator of the tool, minimizes the loss of motive fluid, and increases the life of the associated tool.

Still another object is to provide a novel fluid control device of the foregoing character, which is simple in construction, reliable in operation, and economical to manufacture.

Other objects and advantages will become apparent from the following detailed description and accompanying sheets of drawings, in which:

FIG. 1 is a side elevational view of a torque applying tool assembly incorporating a fluid control device embodying the features of the present invention and showing the device as it would appear when connected to an associated fluid driven mechanism;

FIG. 2 is an enlarged, broken view, partly in section and with a portion thereof rotated about its longitudinal axis to show additional details, of a portion of the tool assembly shown in FIG. 1;

FIG. 3 is an enlarged sectional view of a portion of the fluid control device illustrated in FIG. 2;

FIG. 4 is a sectional view taken substantially along the line 4—4 of FIG. 3; and FIGS. 5 and 6 are views similar to FIG. 2 but respectively showing the parts of the device in the positions they occupy during two different stages of operation thereof.

In FIG. 1 a torque transmitting tool, in this instance a pneumatic nut setter, is illustrated. The nut setter includes a fluid control device or handle assembly 10 embodying the features of the present invention, and a fluid driven mechanism or pneumatic motor 11 having a right angle drive head 12 secured thereto. The drive head 12 has an output shaft or spindle 13 to which sockets or the like (not shown) may be releasably connected. It will be understood that while the device 10 will be hereinafter illustrated and described as part of a pneumatic nut setter, it could also be used to control the quantity and pressure of a motive fluid supplied to numerous other types of devices or tools. It will also be understood that while the device 10 will hereinafter be described as controlling a flow of compressed air, it could also be used to control the flow of fluids other than air.

Referring now to FIG. 2 in conjunction with FIG. 1, the control device 10 comprises an elongated, generally cylindrical housing 16 having a fluid inlet 17 at one end thereof and a fluid outlet 18 at the other end thereof. The inlet 17, in the present instance, is provided by a tubular insert 15 cast with the housing 16, which is preferably aluminum. The insert 15 is adapted to receive a fitting 19 to which one end of a fluid conduit, such as an air hose 21, is secured.

The outlet 18, in the present instance, is formed by a cored opening in the opposite end of the housing 16 from the inlet 17, and is enlarged as at 22. A threaded coupling 23 is carried at the outlet end of the housing 16 to facilitate connection of the device 10 to the inlet end of the pneumatic motor 11.

Connection of the fluid inlet 17 with the fluid outlet 18 is provided by fluid passage means, indicated generally at 24, which extends substantially longitudinally through the housing 16 and is substantially unrestricted. Thus, assuming that the opposite end of the hose 21 is connected to a suitable source of air under pressure, after passing through the fluid inlet 17, such air enters one end of an elongated portion 26 of the passage means. The opposite end of the portion 26 communicates with a manually operated throttle means in the form of a throttle valve indicated generally at 30 in FIG. 2. When closed, the throttle valve 30 prevents air under pressure from flowing thereby toward the outlet 18 and, when open, permits air under pressure to flow toward the outlet 18.

The throttle valve 30, in the present instance, comprises a valve member in the form of a plunger 32 that is shiftably mounted in a bore 33. The bore 33, in the present instance, is formed in a tubular insert or bushing 34 threaded into the housing 16 and extending generally transversely of the longitudinal axis thereof. Thus, the inner end of the bore 33 intersects the inner end of the passage portion 26 and the outer end of the bore 33 opens to the exterior of the housing 16.

The plunger 32 includes a generally cylindrical body portion 36, the outer end of which closely fits the bore 33, and a poppet-type valve portion 37 engageable with a seat 38 provided by the adjacent corner edge of the bushing 34. A coil spring 39 is provided between the valve portion 37 and the adjacent surface of the passage portion 26 and serves to urge the plunger 32 outwardly in the bore 33 and the valve portion 37 into engagement with its seat 38 so that air is prevented from flowing from the passage portion 26 around the valve portion 37. A lever 40 is pivotally secured, as at 41, to the housing 16 in a position to engage the outer end of the valve body 36 and shift the plunger 32 inwardly to the position illustrated in FIG. 2. When so positioned, the valve portion 37 is disengaged from the seat 38 so that the air may flow around the valve portion 37 and into an annular space 42 provided by a reduced diameter portion 43 on the plunger 32.

Air under pressure from the space 42 flows through a port 44 in the bushing 34 and then enters one end of another portion 45 of the passage means 24 in the housing 16. The other end of the passage portion 45 communicates with pressure regulating means in the form of a pressure regulator 46 positioned closely adjacent the throttle valve 30 and disposed between the latter and the outlet 18.

The pressure regulator 46 is operable to regulate the amount of air flowing through the outlet 18 to the associated fluid driven mechanism, in this instance the pneumatic motor 11, and comprises another tubular insert or bushing 47 pressed into or otherwise secured in a bore 48 in the housing 16. The bore 48 also extends generally transversely of the longitudinal axis of the housing 16 and intersects the portion 45 of the passage means. The lower end of the bore 48 is closed by a threaded plug 52, and the upper end of the bore 48 is enlarged and threaded to receive a cap 53.

Communication between the passage portion 45 and the interior of the bushing 47 is provided by an arcuate opening or port 56 in the side of the bushing. Adjustment of the effective size of the opening 56 in order to vary the quantity of air discharging through the outlet 18 is achieved by varying the position of a piston 57 that is movable in the bushing 47 with respect to the port 56. To this end, the piston 57 includes a stem 58 which is threaded into the closed end, indicated at 59, of the bushing 47. Thus, adjustment of the position of the piston 57 in the bushing 47 to vary the effective size of the port 56 is accomplished by rotating the stem 58 in opposite directions. A lock nut 62 may be provided on the stem 58 to secure the piston in its adjusted position. After passing through the opening or port 56, a regulated flow of air under pressure enters one end of another portion 63 of the passage means and then proceeds generally axially through the portion 63 to the opposite end thereof. The opposite end of the portion 63 communicates with a normally open shut-off valve means in the form of a shut-off valve 70 positioned closely adjacent the pressure regulator 46.

The shut-off valve 70 comprises a valve member in the form of a plunger 72 that is shiftably mounted in another bore 73 extending generally transversely of the longitudinal axis of the housing 16. The bore 73, in the present instance, comprises the interior of another tubular insert or bushing 74 that is pressed into or otherwise secured into a somewhat larger bore 75 in the housing 16. The bore 75 intersects the portion 63 of the passage means and the lower end thereof, as viewed in FIG. 2, is closed as by a threaded plug 77. The upper end of the bore 75, as viewed in FIG. 2, is enlarged as at 76 and closed by a cap 78 threaded into the end of the enlarged bore 76. The cap 78 is provided with a vent opening 79 to permit air to freely move into or out of the chamber or space in the insert 74 behind the plunger 72 during movement of the plunger.

The plunger 72 includes a generally cylindrical body portion 82 closely fitting the bore 73 and a poppet-type valve portion 83 engageable with a seat 84 provided by the adjacent inner corner edge of the bushing 74. In order to extend the useful life of the plunger 72, a replaceable resilient member in the form of an O-ring 86 is mounted in a groove 87 in the valve portion 83, the O-ring 86 being positioned to engage the seat 84 when the plunger 72 is in its closed position shown in FIGS. 3, 5 and 6.

The aforementioned poppet-type valve portion 83 is advantageous in that only a small amount of movement of the plunger 72 is needed to fully open or close the valve 70. In addition, the restriction of the flow of air through the valve 70 by the head of the valve portion 83 as the plunger 72 is moving toward its closed position assists in the rapid closure of the valve.

The plunger 72 is biased toward an open position by a coil spring 89, one end of the spring being seated in an axial recess in the body portion 82 of the plunger and the opposite end of the spring engaging adjusting structure, indicated generally at 90, at the opposite end of the bushing 74 from the seat 84. The construction and manner in which the adjusting structure 90 is adjusted to vary the pressure to which the valve responds and hence the maximum torque output at the shaft 13 of the drive head 12, will be described presently.

Assuming the valve portion 82 is separated from its seat 84, as shown inn FIG. 2, air under pressure in the passage portion 63 will flow around the valve portion 83 and into an annular space 91 provided by a reduced diameter portion 92 on the plunger 72. Air under pressure in the space 91 flows through one of a plurality of ports 93 in the side wall of the bushing 74 and then flows into another portion 94 of the passage means. From the portion 94 the air discharges through the outlet 18. From the outlet 18, a regulated flow of compressed air is supplied to the passages of the pneumatic motor 11 to cause rotation thereof and the output shaft 13 of the drive head 12. Thus, torque is continuously applied to a fastener or other device connected to the shaft 13 so long as air flows through the passage means 24 and the throttle valve 30, pressure regulator 46 and shut-off valve 70, which are arranged in series flow relation in the passage means. The manner in which the plunger 72 of the shut-off valve 70 is caused to shift to the position thereof illustrated in FIG. 5 wherein communication between the portions 63 and 94 of the passage means is broken, will be described hereinafter in connection with the description of the operation of the device 10.

As heretofore mentioned, the device 10 includes adjusting structure 90 for limiting the torque developed by an associated fluid driven mechanism, in this instance the pneumatic motor 11, to a desired value. The adjusting structure 90 comprises an adjusting member or screw 96 (FIGS. 3 and 4) threaded into the outer or upper end of the bushing 74 as viewed in FIGS. 2, 5 and 6. The screw 96 has a central opening therein, the outer portion 97 of which is hexagonal in cross section to provide a socket for receiving an Allen wrench for rotating the screw 96. The inner portion of the opening in the screw 96 is enlarged as at 101 to accommodate the outer portion of a cylindrical plug or pilot 102. The inner portion of the plug 102 extends into the outer coils of the spring 89.

A roll pin 103 extends diametrically through the plug 102 and has a length somewhat greater than the internal diameter of the bushing 74 so that the ends of the pin extend into a pair of slots 104 in the upper or outer end of the bushing 74. The roll pin 103 is also received in one of a plurality of circumferentially arranged pairs of notches (FIGS. 3 and 4) in the inner face, indicated at 106, of the screw 96. In the present instance, four pairs of equiangularly arranged notches 107a–107d, respectively, are provided. Thus, the screw 96 has eight positions of adjustment for each complete revolution thereof in the bushing 74. The roll pin 103 is biased into a particular one of the pairs of notches 107a–d by the spring 89, the spring 89 bearing against a washer 108 carried on the inner portion of the cylindrical pilot 102 between the outer end of the spring 89 and the roll pin 103. Thus, by engaging an Allen wrench (not shown) with the hexagonal portion 97 of the opening in the screw 96 and threading the screw 96 into or out of the bushing 74, the force exerted by the spring 89 on the plunger 72 tending to hold the valve portion 83 off its seat 84, may be varied. The force of the spring 89 is opposed by the force resulting from the pressure of the air in the portion 63 of the passage means acting on the outer or lower surface of the valve portion 83 as viewed in FIG. 2.

ADJUSTMENT OF THE CONTROL DEVICE 10

Adjustment of the adjusting structure 90 after the device 10 has been initially connected to a fluid driven mechanism, such as the motor 11 and driven head 12, or when the tool is to be used in a different application, to limit the torque at the output shaft 13 to a predetermined value, is as follows. Initially, the cap 78 is removed and an Allen wrench is inserted into hexagonal socket portion 97 of the screw 96. The screw 96 is then threaded fully into the bushing 74 until the roll pin 103 bottoms in the lower or inner ends of the slots 104. This causes the spring 89 to be fully compressed so that the force exerted thereby on the plunger 72 holds the outer end of the valve portion 83 engaged with the plug 77, in the manner shown in FIG. 2. Thus, the shut-off valve 70 is temporarily held in its full open position. Thereafter, the cap 53 is removed and the stem 58 of the pressure regulator 46 is rotated in an appropriate direction to increase or decrease the size of the port 56 until a desired torque output is obtained at the drive spindle 13 while the spindle is engaged with a fastener or other article to which torque is to be applied. After this setting is obtained, the piston 57 is locked in position in the bushing 47 by tightening the lock nut 62. The cap 53 is then installed.

Adjustment of the shut-off valve 70 is made with the output shaft 13 of the drive head 12 disengaged from the work. Thus, with the tool separated from the work, the lever 40 is rapidly squeezed and released to cause the motor 11 to be intermittently started and stopped. While this is being done, the adjusting screw 96 is backed off until the plunger 72 shifts to its closed position shown in FIG. 5 and the flow of compressed air to the motor 11 is shut off. The lever 40 is then released and the screw 96 is threaded into the bushing 74 an amount sufficient to prevent the plunger 72 from shifting to its closed position when the lever 40 is triggered suddenly. The device 10 is then properly adjusted and the tool is ready for operation.

OPERATION OF THE CONTROL DEVICE 10

Assuming that the device 10 has been adjusted as previously described, and a socket or the like (not shown) connected to the spindle 13 of the drive head 12 is engaged with a fastener or other article to which torque is to be applied, a torquing operation is initiated by squeezing the lever 40 until it is in the position thereof shown in FIG. 2. When so positioned, the throttle plunger 32 will be shifted inwardly in its bore 33 a sufficient distance to cause the valve portion 37 to separate from its seat 38. Consequently, compressed air from the supply hose 21 will flow through the portions 26 and 45 of the fluid passage in the device to the pressure regulator 46. The flow then proceeds through the port 56 in the pressure regulator 46, the port 56 being effective to reduce the quantity of air flowing through the fluid passage portions of the device by an amount sufficient to obtain a desired stall torque setting at the output shaft 13.

After passing through the pressure regulator 46, the flow of compressed air passes through the open shut-off valve 70 and thence through the outlet 18 into the passages of the fluid motor 11 to operate the motor. The output shaft 13 is thus rotated and torque is applied to the fastener or other work by the socket (not shown) connected to the spindle 13.

While substantially all of the air entering the inlet 17 of the device 10 flows through the portions of the fluid passage 24 therein to the outlet 18 and thence to the motor 11, a small portion of this flow is bled off to pressurize a lubricant reservoir 112 (FIG. 2) in the housing 16. The lubricant reservoir 112 is connected to the portion 45 of the fluid passage 24 by a passage 113 which communicates with another port or opening 114 in the bushing 34. An oil flow regulator assembly 116 is threaded into the housing 16 so as to intersect the passage 113 and permit a small quantity of lubricant to flow in a reverse direction from the chamber 112 through the passage 113 to the port 114 when the pressure in the passage portion 45 is reduced to atmospheric.

As the reaction torque on the spindle 13 from the fastener increases, the pressure in the passages of the motor and control device 10 also increases. Such pressure increase acts on the lower or outer end face 83 of the shut-off valve plunger 72 until the pressure force exerted on the plunger 72 exceeds the force exerted thereon by the spring 89 tending to hold the valve in its open position. When this occurs, the plunger 72 rapidly shifts from its open position illustrated in FIG. 2 to its closed position illustrated in FIG. 5, thereby shutting off the supply of compressed air to the motor 11. Shifting of the plunger 72 to its closed position occurs before the motor 11 and output shaft 13 stall. After the shut-off valve 70 closes, the pressure in the passages of the motor 11 rapidly drops to atmospheric pressure and the motor 11 and output shaft 13 cease to rotate. Consequently, torque is no longer applied to the work.

Rapid closure of the valve 70 and the substantially instantaneous drop in pressure in the passages in the motor 11 provide several important advantages, namely: (1) the torque reaction exerted by the tool on the operator is reduced; (2) the operator cannot apply torque to the work by hand after the shut-off valve 70 has closed since any attempt to do so will only rotate the motor 11 in a reverse direction; (3) loss of air through the passages in the motor 11 is eliminated; and (4) the life of the motor 11 and drive head 12 is extended by eliminating excessive stresses on the parts thereof.

As long as the operator maintains the lever 40 in its "on" position shown in FIGS. 2 and 5, air under pressure in the portion 26 of the fluid passage in the device 10 will maintain the shut-off valve 70 in its closed position, as illustrated in FIG. 5. However, as soon as the operator releases the lever 40 and permits it to move to its "off" position illustrated in FIG. 6, the throttle plunger 32 will shift to the position thereof shown in FIG. 6 due to the force of the spring 39. When so positioned, the valve portion 37 of the plunger 32 will be engaged with its seat 38 so that air under pressure in the portion 26 of the fluid passage is prevented from flowing past the throttle valve 30. In addition, the upper or outer end of a recess or flat 117 on the body portion 36 of the throttle plunger 32 will extend beyond the open end of the bore 33 in the bushing 34 and vent the portions 45 and 63 of the fluid passage in the body 16 to the atmosphere. As the pressure in the passage portion 63 drops, the spring 89 will shift the shut-off valve plunger 72 to its open position shown in FIG. 2 and the tool is then ready for another cycle of operation.

I claim:

1. A fluid control device adapted to control a flow of motive fluid to an associated fluid operated mechanism, said device comprising a housing having an inlet adapted to be connected to a source of motive fluid under pressure and an outlet adapted to be connected to said mechanism, said housing also having fluid passage means therein extending between said inlet and outlet, throttle means in said housing and including a throttle valve member shiftably mounted in said housing and operable to permit or prevent motive fluid flow from said inlet through said fluid passage means to said outlet, fluid pressure regulating means in said housing and connected to said fluid passage means between said throttle means and said outlet, said pressure regulating means including a pressure regulating valve member shiftably mounted in said housing and defining a variable area opening in said fluid passage means for controlling the quantity of motive fluid flowing through said outlet, and shut-off valve means in said housing and connected to said fluid passage means between said pressure regulating means and said outlet, said shut-off valve means including a shut-off valve member shiftably mounted in said housing and movable between a first position permitting fluid flow through said fluid passage means and a second position preventing fluid flow past said shut-off valve member to said outlet, said shut-off valve member having a surface exposed to the pressure of the fluid in said passage means between said pressure regulating means and said outlet and being movable to said second position when the pressure in said passage means reaches a predetermined value.

2. The fluid control device of claim 1, further characterized in that said housing is elongated and said throttle valve means, said pressure regulating valve means, and said shut-off valve means are arranged in side-by-side relation and said throttle valve member, said pressure regulating valve member and said shut-off valve member are each movable in a direction generally transverse to the longitudinal axis of said housing.

3. The fluid control device of claim 2, further characterized in that said passage means extends generally longitudinally through said housing, and said throttle means, said pressure regulating means, and said shut-off valve means are positioned closely adjacent to each other and are arranged in series flow relation in said passage means.

4. The fluid control device of claim 1, further characterized in that said throttle valve member is shiftably mounted in a bore in said housing, one end of said bore being connected to said passage means and the other end of said bore communicating with the atmosphere, and said throttle valve member has a vent recess therein arranged to connect the portion of said passage means between said shut-off valve member and said throttle valve member with the atmosphere when said shut-off valve member is substantially in said second position.

5. The fluid control device of claim 4, further characterized in that said throttle valve member includes a body portion closely fitting said bore for at least a portion of its length and a valve portion engageable with a seat in said bore, said valve portion being operable when engaged with said seat to prevent fluid flow through the portion of said passage means between said inlet and said valve portion, and said vent recess comprises a flat on said body portion and positioned to provide said connection between said first mentioned portion of said passage means and the atmosphere.

6. The fluid control device of claim 4, further characterized in that said housing includes means providing a seat in said passage means between said pressure regulating means and said outlet, and said shut-off valve member includes a poppet valve portion movable toward and away from said seat.

7. The fluid control device of claim 6, further characterized in that a replaceable resilient member is removably carried by said poppet valve portion and located thereon so as to engage said seat when said shut-off valve member is shifted fully toward said seat.

8. The fluid control device of claim 7, further characterized in that said replaceable resilient member comprises an O-ring.

9. In a fluid control device for controlling a flow of motive fluid to an associated fluid operated mechanism, said device including a housing having an inlet adapted to be connected to a source of fluid under pressure, an outlet adapted to be connected to said associated mechanism, and passage means extending between said inlet and outlet, said device also including shut-off valve means having a shut-off valve member shiftably mounted in said housing and spring means biasing said shut-off valve member toward a first position permitting fluid flow through said passage means from said inlet to said outlet, said shut-off valve member being movable to a second position preventing fluid flow past said shut-off valve member to said outlet when the pressure in said passage means reaches a predetermined value, the improvement comprising adjusting structure adapted to vary the force exerted by said spring means on said shut-off valve member, said adjusting structure comprising an adjusting member threadedly movable with respect to said housing and adapted to engage said spring means, said adjusting member also having a plurality of circumferentially arranged notches therein, and a detent successively movable into and out of said notches as said adjusting member is rotated, whereby said adjusting member may be threadedly moved with respect to said housing to vary the force exerted by said spring means on said shut-off valve member and said notches and detent are effective to releasably retain said adjusting member in an adjusted position.

10. The adjusting structure of claim 9, further characterized in that said adjusting member has an end face disposed toward said spring means, said notches are formed in said end face and arranged in diametrically extending, equiangularly spaced pairs, and said detent is disposed between said adjusting member and said spring means and extends diametrically with respect to said notches, whereby said spring means urges said detent into one of said pairs of notches for each position of adjustment of said adjusting member.

11. The adjusting structure of claim 10, further characterized in that said shut-off valve member is shiftably mounted in a bore in said housing, a diametrically arranged pair of axially extending recesses are provided in the wall of said bore, said adjusting member is adapted to be threaded into said bore, and the opposite ends of said detent are respectively adapted to extend into the recesses in the wall of said bore to prevent rotation of said detent with respect to said adjusting member.

* * * * *